United States Patent Office 3,291,840
Patented Dec. 13, 1966

3,291,840
TERTIARY PHOSPHINE OXIDES
Sheldon A. Buckler and Martin Epstein, Stamford, Conn., assignors to American Cyanamid Company, New York, N.Y., a corporation of Maine
No Drawing. Filed Mar. 1, 1962, Ser. No. 176,775
7 Claims. (Cl. 260—606.5)

The present invention relates to hydroxy-substituted tertiary phosphine oxides. More particularly, the instant discovery concerns tertiary phosphine oxides of the formula

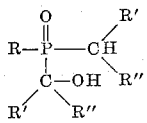

wherein R represents alkyl, substituted or unsubstituted, having from 1 to 18 carbon atoms, aryl, para-halosubstituted phenyl, and cycloalkyl; R' represents hydrogen and methyl; R" represents methyl, ethyl, phenyl, naphthyl and para-substituted phenyl; when R" is alkyl, R' is necessarily alkyl, and when R" is aryl, R' is necessarily H; R' and R" taken together also represent the residue of a cycloalkyl ring selected from cyclopentyl and cyclohexyl; and the sum of the steric substituent constants, $E_s$, of the moities R and

is greater than $-1.50$ at $25°$ C.

These hydroxy-substituted tertiary phosphine oxides are prepared by reacting the corresponding primary phosphine of the formula $RPH_2$ with the corresponding ketone or aromatic aldehyde of the formula

in the presence of concentrated acid, particularly a concentrated mineral acid such as HCl, $H_2SO_4$, HBr, $H_3PO_4$, and the like. When the sum of the steric substituent constants, $E_s$, of the moieties

and R is below $-1.50$ at $25°$ C., say $-1.85°$, the reaction contemplated herein is arrested and a secondary phosphine oxide results, the

moiety not being formed and the atom H appearing in its place. This is the subject of copending U.S. application Serial No. 176,816 filed simultaneously herewith on March 1, 1962.

A typical embodiment according to the present invention is the following in which phenylphosphine is reacted with cyclohexanone in the presence of concentrated hydrochloric acid:

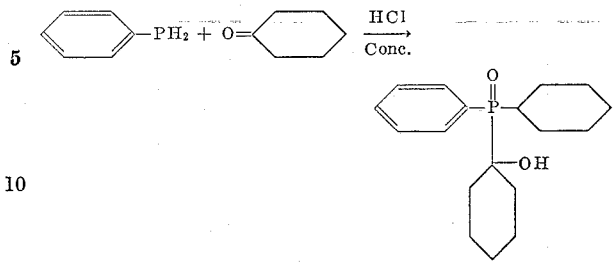

The steric substituent constants, $E_s$, at $25°$ C. are fully defined in the literature in various places. Typically, the text, "Steric Effects in Organic Chemistry," edited by Melvin S. Newman and published by John Wiley and Son, Inc., New York, New York (1956), discloses on page 598 thereof the various steric substituent constants for aliphatic substituents, etc.

The reactants of the present invention may be brought together in almost any sequence. While stoichiometric amounts of these reactants react to form the products of the present invention, it is not critical or necessary to have only stoichiometric amounts present. Any surplus of any reactant with respect to the other may be present without affecting the nature of the reaction. Obviously, too large a surplus is both cumbersome and impractical.

While reaction is generally carried out at room temperature ($20°$ C.–$25°$ C.), temperatures in the range of $0°$ C.–$150°$ C. may be employed. In addition, atmospheric sub-atmospheric or super-atmospheric pressures may be employed without changing the nature of the reaction.

Pursuant to the instant discovery a wide variety of hydroxy-substituted tertiary phosphine oxides may be produced. The process is unprecedented and very attractive in view of the fact that it is a one-step method for producing compounds which are valuable.

Typical primary phosphines within the purview of the instant invention are phenylphosphine, cyclohexylphosphine, para-chlorophenylphosphine, para-bromophenylphosphine, isobutylphosphine, butylphosphine, 2-methoxyethylphosphine, octylphosphine, methylphosphine, cyanoethylphosphine, dodecylphosphine, hexadecylphosphine, octadecylphosphine, isopropylphosphine, and the like. As is evident from this representative list of primary phosphine reactants, lower alkoxy-substituted and cyano-substituted alkyl phosphines are contemplated herein as reactants, as well as para-halosubstituted phenyl phosphines.

Typical carbonyl compounds are cyclohexanone, cyclopentanone, dimethyl ketone, benzaldehyde, naphthaldehyde, para-chlorobenzaldehyde, para-hydroxybenzaldehyde, and ethylmethyl ketone.

*Example I*

Into a distilling flask purged with nitrogen is placed two parts of cyclohexanone dissolved in 50 parts of concentrated hydrochloric acid. One part of phenylphosphine is added thereto and the resulting solution refluxed for 22 hours. A two layer substance forms which is diluted with water and extracted three times with chloroform. Upon evaporating the solvent from the extracted material a solid residue results. This product residue is then recrystallized from acetonitrile and is identified as (1-hydroxycyclohexyl) cyclohexylphenylphosphine oxide.

*Examples II–XIV*

In the following table Example I, above, is repeated in every essential respect with the exception that the reaction conditions are modified within the scope of conditions contemplated herein and, of course, the corresponding products are produced:

upon the scope of the invention, except insofar as they appear in the appended claims.

We claim:
1. (1 - hydroxycyclohexyl)cyclohexylphenylphosphine oxide.
2. (1 - hydroxycyclopentyl)cyclopentylphenylphosphine oxide.
3. ($\alpha$ - hydroxybenzyl)benzylphenylphosphine oxide.
4. ($\alpha$ - hydroxybenzyl)benzylcyclohexylphosphine oxide.
5. ($\alpha$ - hydroxybenzyl)benzyl-n-octylphosphine oxide.
6. ($\alpha$ - hydroxybenzyl)benzylisobutylphosphine oxide.

TABLE I

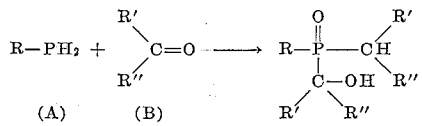

| Example No. | Primary Phosphine (A) | Carbonyl Compound (B) | Conc. Acid | Molar Ratio, A:B | Temp., °C. | Secondary Phosphine Oxide (C) |
|---|---|---|---|---|---|---|
| II | Phenylphosphine | Cyclopentanone | HCl | 1:1 | 80 | (1-hydroxycyclopentyl)cyclopentylphenylphosphine oxide. |
| III | Cyclohexylphosphine | Dimethyl ketone | $H_2SO_4$ | 1:2 | 50 | (1-hydroxy-1-methylethyl)isopropylcyclohexylphosphine oxide. |
| IV | Isobutylphosphine | Benzaldehyde | HCl | 2:1 | 20 | ($\alpha$-Hydroxybenzyl)benzylisobutylphosphine oxide. |
| V | Cyclohexylphosphine | ...do... | HBr | 1:3 | 100 | ($\alpha$-Hydroxybenzyl)benzylcyclohexylphosphine oxide. |
| VI | n-Octylphosphine | p-Chlorobenzaldehyde | HCl | 1:5 | 25 | ($\alpha$-Hydroxy-p-chlorobenzyl)-p-chlorobenzyl-n-octylphosphine oxide. |
| VII | Butylphosphine | 1-naphthylaldehyde | $H_2SO_4$ | 3:1 | 75 | ($\alpha$-Hydroxynaphthyl)(-1-naphthyl) butylphosphine oxide. |
| VIII | Dodecylphosphine | p-Hydroxybenzaldehyde | HCl | 1:6 | 90 | ($\alpha$-Hydroxy-p-hydroxybenzyl)-p-hydroxybenzyldodecylphosphine oxide. |
| IX | Hexadecylphosphine | Dimethyl ketone | $H_3PO_4$ | 3:1 | 0 | (1-hydroxy-1-methylethyl)isopropylhexadecylphosphine oxide. |
| X | Cyanoethylphosphine | p-Methoxybenzaldehyde | HCl | 1:4 | 80 | ($\alpha$-Hydroxy-p-methoxybenzyl)-p-methoxybenzylcyanoethylphosphine oxide. |
| XI | Methylphosphine | Ethylmethyl ketone | $H_2SO_4$ | 1:3 | 40 | (1-hydroxy-1-methylpropyl)-(1-methylpropyl)-methylphosphine oxide. |
| XII | Para-chlorophenylphosphine | Cyclopentanone | HCl | 1:2 | 100 | (1-hydroxycyclopentyl)cyclopentyl-p-chlorophenylphosphine oxide. |
| XIII | Para-bromophenylphosphine | ...do... | HCl | 1:2 | 35 | (1-hydroxycyclopentyl)cyclopentyl-p-bromophenylphosphine oxide. |
| XIV | 2-methoxyethylphosphine | Cyclohexanone | HCl | 1:2 | 45 | (1-hydroxycyclohexyl)cyclohexyl-2-methoxyethylphosphine oxide. |
| XV | Phenylphosphine | Benzaldehyde | HCl | 1:2 | 100 | ($\alpha$-Hydroxybenzyl)benzylphenylphosphine oxide. |
| XVI | Cyclohexylphosphine | ...do... | HCl | 1:2 | 100 | ($\alpha$-Hydroxybenzyl)benzylcyclohexylphosphine oxide. |
| XVII | n-Octylphosphine | ...do... | HCl | 1:2 | 100 | ($\alpha$-Hydroxybenzyl)benzyl-n-octylphosphine oxide. |
| XVIII | Isobutylphosphine | ...do... | HCl | 1:2 | 100 | ($\alpha$-Hydroxybenzyl)benzyl-isobutylphosphine oxide. |
| XIX | Phenylphosphine | 1-naphthaldehyde | HCl | 1:2 | 100 | ($\alpha$-Hydroxy-1-naphthylmethylene)-1-naphthylmethylene phenylphosphine oxide. |

The compounds of the present invention are particularly useful as sequestering agents in the selective removal of heavy metal values from mixtures containing ions, such as uranyl. Uranyl values can be selectively leached from an ore containing the same by employing techniques known in the art, as shown by Blake et al. in the Atomic Energy Commission Report ORNL–1903, May 13, 1955.

By concentrated mineral acid herein is intended a strong mineral acid having at least 8 molar concentration of the acid in aqueous solution. While no lower than about 8 molar acid concentration is contemplated herein, there should be at least a minimum of 10% water in the aqueous acid solution.

Clearly, the instant discovery encompasses numerous modifications within the skill of the art. Consequently, while the present invention has been described in detail with respect to specific embodiments thereof, it is not intended that these details be construed as limitations 7. ($\alpha$ - hydroxy - 1-naphthylmethylene)-1-naphthylmethylenephenylphosphine oxide.

References Cited by the Examiner

UNITED STATES PATENTS 2,957,931 10/1960 Hamilton et al. _ 260—606.5 X

OTHER REFERENCES

Berlin et al., Chemical Reviews, pages 249 and 253, volume 60, 1960.

Buckler et al., Journal of the American Chemical Society, volume 82, 1960, pages 2076 and 2077.

HELEN M. McCARTHY, *Primary Examiner.*

LEON D. ROSDOL, TOBIAS E. LEVOW, *Examiners.*

L. A. SEBASTIAN, F. R. OWENS, W. F. W. BELLAMY, *Assistant Examiners.*